C. E. JACQUEMOUD.
REGULATING ESCAPEMENT MECHANISM FOR CLOCKWORK.
APPLICATION FILED DEC. 30, 1915.

1,178,922.

Patented Apr. 11, 1916.
2 SHEETS—SHEET 1.

Charles Ernest Jacquemoud
Inventor
by Laurena Rangres
Attorney

C. E. JACQUEMOUD.
REGULATING ESCAPEMENT MECHANISM FOR CLOCKWORK.
APPLICATION FILED DEC. 30, 1915.
1,178,922.
Patented Apr. 11, 1916.
2 SHEETS—SHEET 2.
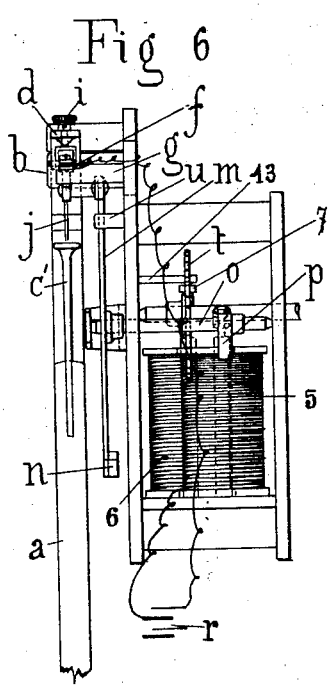
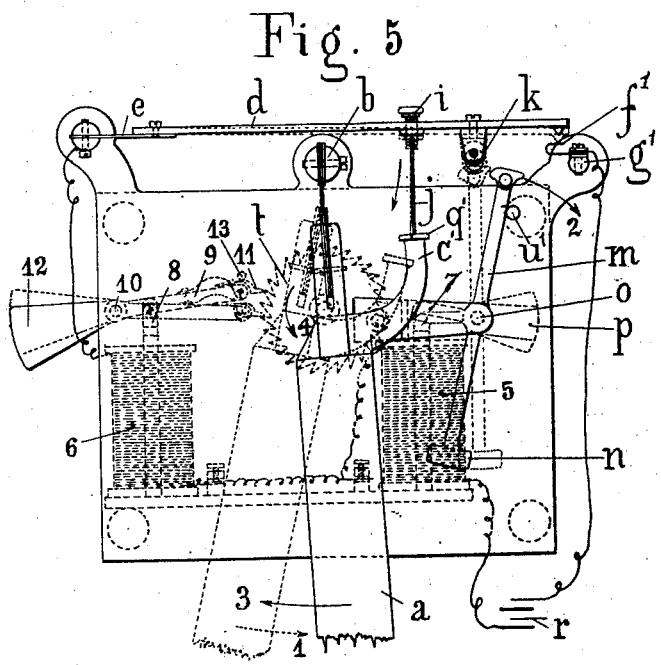
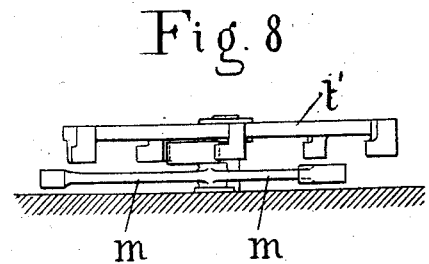
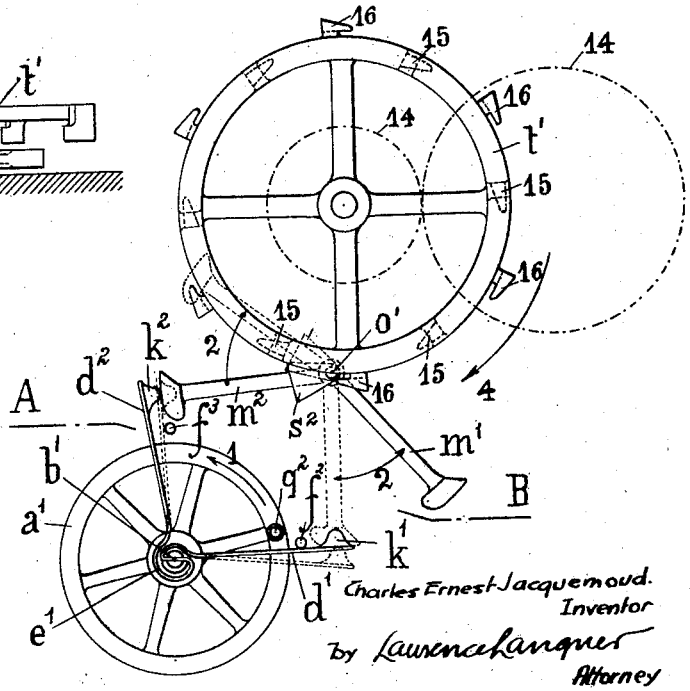
Charles Ernest Jacquemoud.
Inventor
by Laurence Langner
Attorney

UNITED STATES PATENT OFFICE.

CHARLES ERNEST JACQUEMOUD, OF IMMENSEE, NEAR KÜSSNACHT, SWITZERLAND.

REGULATING ESCAPEMENT MECHANISM FOR CLOCKWORK.

1,178,922.  Specification of Letters Patent.  Patented Apr. 11, 1916.

Application filed December 30, 1915. Serial No. 69,438.

*To all whom it may concern:*

Be it known that I, CHARLES ERNEST JACQUEMOUD, citizen of the French Republic, residing at Immensee, near Küssnacht, in the Canton of Schwyz and State of Switzerland, have invented certain new and useful Improvements in Regulating Escapement Mechanism for Clockwork; and I do hereby declare the following to be a full, clear, and exact description of the invention, such as will enable others skilled in the art to which it appertains to make and use the same, reference being had to the accompanying drawings, and to letters or figures or reference marked thereon, which form a part of this specification.

This invention relates to a regulator mechanism for clockwork, and has for its object so to construct the regulator that the work done by the force which causes the movement of the oscillating member (pendulum or balance wheel) is strictly constant and is always transmitted to this member at the same part of its oscillation. For this purpose the regulator mechanism comprises a pressure lever or spring which is raised at regular intervals determined by the movement of the balance wheel or pendulum, by the motor of the clockwork (spring motor, weight motor, electric motor) so as periodically to impart to the lever a determined potential energy always the same so that the pressure lever subsequently transmits, when there is no longer any positive connection between it and the motor, a quantity of energy always equal to the oscillating member with which it contacts at regular intervals at the moment when the elongation attains a determined value, which is always the same and with which it moves with the least possible friction during the same part of the oscillation.

The accompanying drawings show three examples of construction according to the invention.

Figure 2:
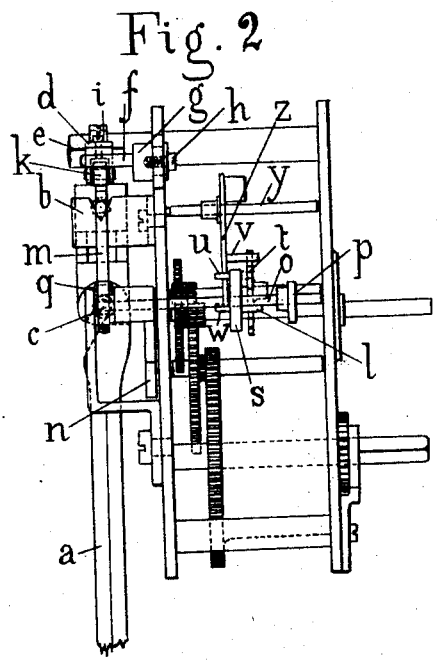
Figure 1:
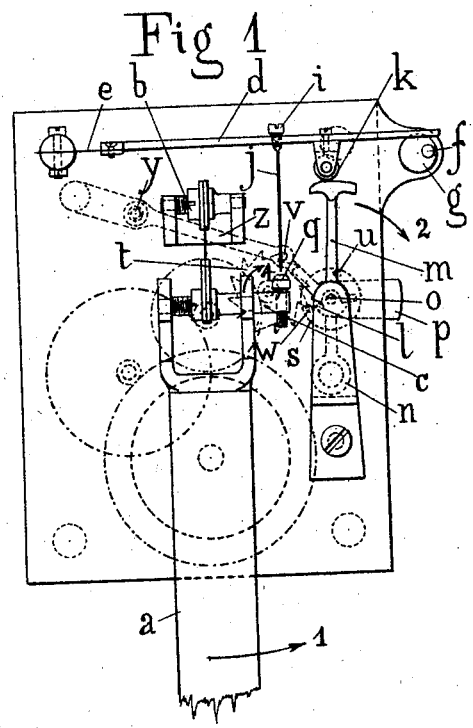
Figure 4:
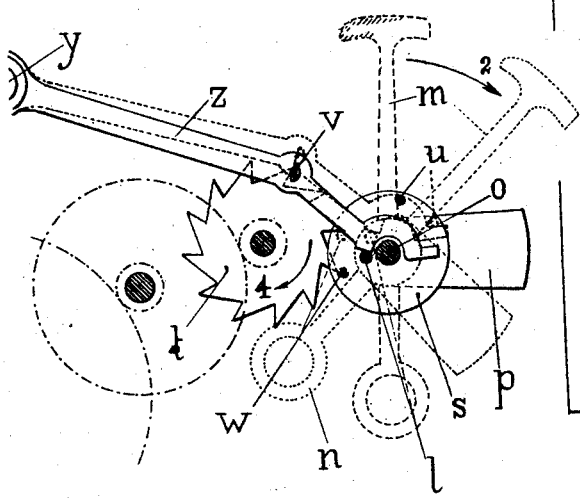
Figure 3:
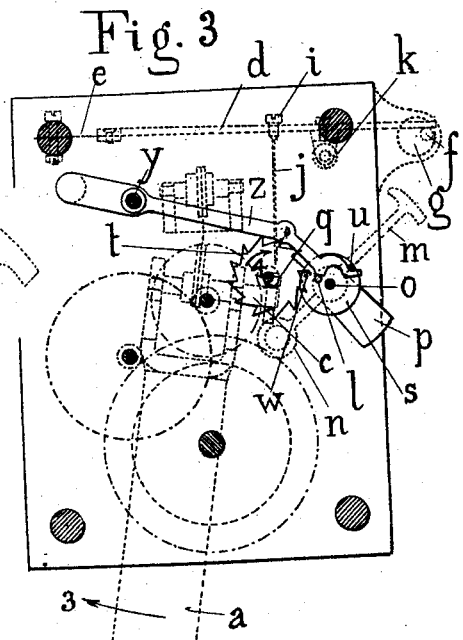

Figure 1 shows a rear view of one example of construction of the regulator applied to a clock with the ordinary pendulum; Fig. 2 shows a side view; Fig. 3 shows a section corresponding with Fig. 1, the rear plate and the parts intersected being indicated in chain dotted lines; Fig. 4 shows to a larger scale the escapement device; Fig. 5 shows a rear view of a form of construction of regulator applied to an electric clock; Fig. 6 shows a side view; Fig. 7 shows a plan view of a form of construction of regulator applied to a watch; and Fig. 8 shows a section on the line A—B of Fig. 7.

According to the first form of construction shown in Figs. 1 to 4, the pendulum $a$ is provided near its suspension attachment $b$ with a lateral arm $c$ having a small flat surface, formed for instance by the head $q$ of an adjustable screw at the top of the arm. Above the pendulum $a$ is mounted the pressure lever $d$ (in the present case a blade of metal) attached to the left hand side of the rear plate by means of a thin spring-steel blade $e$, for the purpose of insuring its movement without friction. The right hand end of the pressure lever $d$ rests upon a pin $f$ fixed eccentrically in a boss $g$ secured to the rear plate by means of a screw $h$ in such a manner that the boss can be turned so that the height of the pin $f$ can be regulated according to requirements, thus permitting the lower position of the pressure lever to be changed. The pressure lever is also provided always at the right hand end, with a set screw $i$ furnished at its lower extremity with a small steel pin $j$ slightly pliant, and which is adapted to contact with the adjustable head $q$ on the lateral arm of the pendulum $a$. Between the set screw $i$ and the limiting pin $f$, the pressure lever $d$ carries a roller or jewel $k$ (such as a ruby or other hard stone). Below this roller there is mounted upon an arbor $o$, a lifting lever $m$ counterbalanced by a weight $n$. The upper end of this lever is rounded off in such a manner that it can conveniently engage under the roller and thus raise the pressure lever through a certain distance. Upon the arbor $o$ is mounted a counterweight $p$ which tends to move the lifting arm $m$ in the direction of the arrow 2 into the position indicated in Fig. 3, that is to say turned away from the roller $k$. This lever is held in the raised position (Figs. 1 and 4) by the tension or weight of the pressure lever $d$ resting thereon. On the arbor $o$ is mounted the pin $w$ which is adapted to engage between the teeth of the escapement wheel $t$ in such a manner that this wheel in turning will press upon the pin $w$, turning the disk $s$ with the arbor $o$, and at the same time the lifting lever $m$ so that the latter is moved from its disengaged position shown in Fig. 3 into the raised position shown in Figs. 1 and 4, and consequently its rounded end engages under the roller $k$ and raises the pressure lever $d$. Upon an arbor $y$ arranged to the left of the pendulum between the plates of the clockwork, is mounted a stop lever $z$ for the escapement wheel $t$ whose blade $v$ is adapted to engage with the teeth of the escapement wheel. The end of the lever $z$ is prolonged up to over a pin $l$ disposed on the opposite side to pin $w$ on the disk $s$ (Fig. 4) in such a manner that during the return movement of the lifting lever $m$ the pin $l$ in the turning movement of the disk $s$ will lift the stop lever $z$, so that the blade $v$ releases the tooth with which it was engaged and permits the escapement wheel to run freely. A stop $u$ secured to the disk $s$ on the same side as pin $l$ above the curved end of the lever $z$, limits the highward movement of the stop lever.

The operation of this regulator mechanism is as follows: Assuming the clock to be stopped, the different parts will be in the position shown in Fig. 1. By now moving the pendulum to the right (arrow 1) the head $q$ on the lateral arm $c$ will be caused to strike against the pliant pin $j$ of the pressure lever $d$, slightly lifting the latter. The roller $k$ will now be raised from the lifting lever $m$, which will fall back in the direction of the arrow 2. The pressure lever $d$ being no longer held up, will press upon the head $q$ on the lateral arm $c$ of the pendulum $a$ by means of the pliant pin $j$, and will follow the return movement of the pendulum in the direction of the arrow 3 until its free end comes to rest upon its stop pin $f$, imparting in this manner a certain impulse to the pendulum. The lever $m$ in its backward movement turns the disk $s$, whose pin $l$ raises the stop lever $z$, thus releasing the escapement wheel $t$ which turns in the direction of the arrow 4 under the force exerted by the motor of the clockwork. After a small angular movement of the escapement wheel, one of its teeth will press on the pin $w$ of the disk $s$, moving this latter backward and at same time forcing the lifting lever $m$ to return to its vertical position wherein it lifts the pressure lever $d$ into its original position slightly raised from the stop pin $f$. The stop lever $z$ following the backward movement of the disk $s$ is again lowered and stops by means of its blade $v$ the next tooth of the escapement wheel, so that the whole mechanism is again in its original position until the lateral arm $c$ of the pendulum $a$ in its return movement (in the direction of arrow 1) again strikes by its head $q$ against the pliant pin $j$, when the series of movements described begin again.

The pressure lever $d$ is always raised through exactly the same distance, and will thus always receive the same amount of kinetic energy, which it transmits subsequently to the pendulum; it works practically without friction because it is supported by means of the blade $e$, while its pliant pin $j$ transmits the impulses without loss to the pendulum $a$, and hence the impulses transmitted to the pendulum will always be exactly the same so that absolutely no variation in the working of the clockwork is possible from this cause. This regularity of working is insured no matter what variation there may be in the force exercised by the motor of the clockwork. The only possible variation in the working of a clock provided with such a regulator are due to the effects of expansion of the different parts, and by taking account of these by known available methods, it is possible to obtain easily a regularity in working equal to that of chronometers working $in$ $vacuo$, which are the most exact in existence, having a variation at the maximum of a few seconds after working for a complete year.

In the example of construction illustrated in Figs. 5 and 6 the invention is shown as applied to an electric clock. The arrangement of the pressure lever $d$, pendulum $a$ and lifting lever $m$ is the same as in the example of construction previously described. On the other hand, the main spring motor of the clockwork is replaced by a pair of electromagnets 5 and 6 suitably wound and supplied from a suitable source of current $r$. A lever 7 fixed on the arbor $o$ forms the armature for the electromagnet 5, while the arbor $o$ carries the lifting lever $m$ and the counterweight $p$ in such a manner that when an elecric current passes through the coil of the electromagnet 5 its core being magnetized, attracts the lever 7 moving the lifting lever into the vertical position, thereby causing the pressure lever $d$ to be lifted. Opposite the core of the electromagnet 6 is arranged an armature 8 fixed on an oscillating lever 9 pivoted on an arbor 10, of which the free end is furnished with an operating pawl 11 acted upon by a spring which holds it in position, forming an extension of the oscillating lever 9; this pawl is adapted to engage between the teeth of a wheel $t$ similar to an escapement wheel. The lever 9 is acted upon by a counterweight 12 tending to hold the lever in its raised position, which position is limited by a stop 13 secured to the plate of the clockwork. The pawl 11 is of such a construction that when the lever 9 turns downward, owing to its armature 8 being attracted by the electromagnet 6, it strikes against a tooth of the escapement wheel $t$ underneath it, and thus effects a forward movement of this wheel by one tooth. As soon as the electric current is interrupted the counterweight 12 raises the lever 9 into its first position, which movement causes the pawl 11 to slip back over the tooth above it until this tooth has been passed, when the spring permits the pawl to return to its first position ready for engaging the next tooth. The stop for the pressure lever is formed by a bent metal blade $f'$ secured between two mica washers on the boss $g'$ mounted on the rear plate of the clockwork. The source of current $r$ is connected at one side to the winding of the magnet 5, which is connected to the winding of the magnet 6 the latter being connected to the pressure lever $d$, and the other end of the source of current is connected to the bent blade $f'$.

The parts lettered $a$, $b$, $d$ and $e$, $i$, $j$ and $k$, $m$, $n$, $o$ and $p$, are substantially the same as the corresponding parts in Figs. 1 to 4, and will need no further description. The curved arm $c'$ with its head $q'$ correspond to the parts lettered $c$ and $q$ in Figs. 1 to 4, while the lever 7 corresponds in some respects with the detent $s$ in Figs. 1 to 4. An adjustable stop $u'$ limits the backward movement of the lever $m$.

The operation of the regulator just described is as follows: Assuming that the pendulum $a$ is in movement, the head $q'$ of its arm $c'$ strikes in its swing from left to right (arrow 1) against the pliant pin $j$, slightly lifting the pressure lever $d$, thus releasing the lifting lever $m$ which drops. The pressure lever $d$ being now no longer supported, presses by the pliant pin $j$ upon the head $q'$ of the lateral arm $c'$ of the pendulum $a$, accompanying the latter in its movement in the direction of the arrow 3, and imparting to it a certain amount of kinetic energy until the moment when the free end of the lever comes to rest upon the bent blade $f'$, thus closing the electric circuit described. The cores of the electromagnets 5 and 6 now attract their respective armatures. On the one hand the lever 7 is drawn toward the pole of the coil 5, turning the arbor $o$ and bringing the lever $m$ into its vertical position, thus causing it to raise the pressure lever $d$ into its first position, whereby its free end is moved away from the bent blade $f'$, breaking the electric circuit again. On the other hand the armature 8 is attracted by the pole of the magnet 6, pulling the lever 9 downward and consequently turning the escapement wheel $t$ through one tooth, and at the same time causing the hands of the clock to be moved through a corresponding distance. As soon as the electric circuit is broken the oscillating lever 9 is raised by its counterweight into its first position, and all the parts of the clockwork are then again in the starting position, in which they remain until the return movement of the pendulum $a$, when the operation is repeated. In this example of construction it is clear that the pressure lever $d$ is always moved through the same distance, and consequently it always transmits exactly the same amount of kinetic energy to the pendulum, insuring in this way the accurate working of the clockwork. Moreover, as the closing of the electric circuit instantly causes a return movement of the lifting lever, the electric circuit is broken at once so that the expense of power for the control of the clockwork in question is extremely small.

The regulator mechanism shown in Figs. 7 and 8 is particularly applicable to the movements of watches or similar clockwork mechanisms. It comprises an escapement wheel $t'$ driven through a train of wheels 14 from the main spring of the clockwork, which causes the escapement wheel $t'$ to turn in the direction of the arrow 4. The escapement wheel $t'$ is provided with downwardly projecting teeth 15 and 16 arranged in two concentric circles, the side of each projection which is nearest to a circle represented by the outside circumference of the wheel $t'$ and intermediate between the two sets of teeth 15 and 16. Upon the base plate is provided a pin $o'$, the center of which lies upon the circle represented by the outside circumference of wheel $t'$; upon the pin $o'$ is disposed on a level with the teeth 15 and 16, a wedge-shaped block $s^2$. When the wheel $t'$ turns, the teeth 15 and 16 alternately strike against one or other of the lateral sides of the wedge-shaped block, causing it alternately to swing around in one direction or other, as indicated by the position $s^2$ and in dotted lines by the position $s'$ respectively. The pin $o'$ also carries two levers or arms $m'$ and $m^2$ integral with the wedge-shaped block $s^2$ so that each turning movement of the latter will move the arms through the angle 2. On one side of the balance wheel $a'$ there are mounted on a pin $b'$ secured to the base plate, two pressure arms $d'$, $d^2$, of which the inner ends secured to the pin $b'$ are formed as springs $e'$, their free ends being furnished with enlargements $k'$ and $k^2$, adapted to be acted upon by the ends of the corresponding arms $m'$, $m^2$. In this way the arms $d'$, $d^2$ are alternately pressed back a certain distance against the action of their spring ends $e'$, while their return movement when liberated is limited by stops $f^2$, $f^3$. The free ends of the arms $m'$, $m^2$ are enlarged and the outer surfaces are concentric to the pin $o'$, except that the ends which first engage with the projections $k'$, $k^2$ are more rounded so as to come readily into engagement therewith. In the space formed between the two pressure levers $d'$ and $d^2$ the balance wheel $a$ is provided with a projection $q^2$, against which the pressure levers during their retraction, can strike and communicate to the balance wheel a certain impulse. When one of the arms $m'$, $m^2$ engages by its rounded end the enlargement $k'$ or $k^2$ of one of the pressure levers $d'$ or $d^2$, this latter is pushed back a certain distance and its attachment spring is tensioned. The resistance or pressure of the pressure lever $d'$ or $d^2$ upon the outer end of the arm $m'$ or $m^2$ in the position wherein the pressure lever is pressed back, is sufficiently strong to retain the latter so that the wedge-shaped block $s^2$ will not be turned far enough to permit the tooth 15 or 16 which is acting on one of its faces, to slip past that face, and consequently the wheel $t$ is stopped each time after one of its teeth has turned the block $s^2$ with its arms $m'$ and $m^2$ into a position in which the pressure lever $d'$ or $d^2$ is pressed back.

The operation of this regulator mechanism is as follows: Assuming that the pin $q^2$ is moved in the direction of the arrow 1, Fig. 7, while the other parts of the mechanism are in the position shown, the pin will shortly strike the pressure level $d^2$, throwing it slightly backward, and thus relieving the pressure between its enlargement $k^2$ and the end of the arm $m^2$. This will allow the tooth 16 which is pressing against the outer face of the block $s^2$ to turn the said block together with the arms $m'$, $m^2$ into the position shown in dotted lines, while the wheel $t$ is allowed to begin to turn. The arm $m^2$ is thus disengaged from the pressure lever $d^2$, which under the action of its spring returns to its inner position, imparting a return impulse in the direction opposite to the arrow 1, to the balance wheel $a'$ by means of the pin $q^2$, and then striking against the stop $f^2$ while the arm $m'$ engages the enlargement $k'$ of the pressure lever $d'$, pushing this latter back so that the enlargement thereof rises on to the concentric outer surface of the arm, in which position the latter will be held by the pressure exerted upon it by the pressure lever $d'$. At this moment the following tooth 15 of the escapement wheel strikes against the opposite face of the block $s^2$, but this latter being held stationary, the escapement wheel itself is stopped in its rotary movement. The projection $q^2$ next strikes against the pressure lever $d'$, slightly pressing this back, and in this way releasing the arm $m'$ and with it the block $s^2$. The escapement wheel $t'$ being now no longer stopped, will again cause the block $s^2$ to return to its first position moving with it the arms $m'$ and $m^2$, the arm $m'$ being disengaged from the pressure lever $d'$, while the second arm $m^2$ is moved under the enlargement $k^2$ of the second pressure lever $d^2$. The pressure lever $d'$ will re-act upon the projection $q^2$ on the balance wheel, causing the latter to carry out its return movement and at the same time imparting to it a definite impulse. As the pressure levers are always repelled exactly through the same distance and their springs are tensioned to the same degree, the energy transmitted to the balance wheel as also the time during which the escapement wheel is stopped, is always the same, so that a regular working of the clockwork is insured. By mounting the pressure levers centrally relatively to the balance wheel, the action of the pressure levers upon the pin $q^2$ of the latter is effected without any friction.

Having thus described my invention what I claim as new and desire to secure by Letters Patent is:—

1. In an escapement regulator mechanism for clockwork, the combination with an escapement wheel and an oscillating member, of a projection on the oscillating member, a spring-operated pressure lever adapted to contact with the projection at regular intervals, a rocking lever, means for rocking said lever at intervals, said rocking lever being adapted to press back the pressure lever when it is rocked in one direction, and a stop for limiting the inward movement of the pressure lever.

2. In an escapement regulator mechanism for clockwork, the combination with an escapement wheel and an oscillating member, of a projection on the oscillating member, a spring-operated pressure lever, said lever being adapted to impart an impulse to the oscillating member during a portion of its movement by striking the projection, a rocking lever adapted in one position to press back the pressure lever and to be held in this position by the pressure lever until released by the projection contacting with the pressure lever on the return movement of the oscillating member.

3. In an escapement regulator mechanism for clockwork, the combination with an escapement wheel and an oscillating member, of a projection on the oscillating member, a spring-operated pressure lever, said lever being adapted to contact with the projection so as to impart an impulse to the oscillating member, a rocking arbor, a member mounted on said arbor, said member when in one position preventing the rotation of the escapement wheel, a lever mounted on the rocking arbor, said lever when rocked in one direction being adapted to press back the pressure lever from the projection and to be retained by said pressure lever until the pressure lever is pressed farther back, whereupon said lever permits the escapement wheel to be released.

4. In a clockwork escapement mechanism, the combination of a pendulum, a lateral projection on the pendulum, a spring-operated lever, said lever coöperating with the lateral projection to impart an impulse to the pendulum, a stop limiting the movement of the spring-operated lever, an escapement wheel, two arbors, a rocking arm mounted on one arbor and adapted to arrest the escapement wheel, a rocking lever on the other arbor, said lever in one position being adapted to be engaged with the pressure lever and to press back the latter, a detent on the arbor of the rocking lever, and means for rocking the detent and arm when free so that the escapement wheel is released and the pressure lever can again impart energy to the projection on the pendulum at the end of the return movement of the pendulum.

5. In an escapement regulator mechanism for clockwork, the combination with an escapement wheel and an oscillating member, of a lateral projection on the oscillating member, a spring-operated lever, a pliant pin adjustably mounted on said lever, said pin coöperating with the projection to impart impulses to the oscillating member, a stop limiting the inward movement of the pin, a rocking lever and detent, said detent coöperating with the escapement wheel, and in one position arresting the escapement wheel, a rocking arm adapted to arrest the escapement wheel in another position, the rocking lever being adapted to engage with the pressure lever, and means for rocking the lever and detent to release the escapement wheel, when said rocking lever is disengaged from the pressure lever.

6. In an escapement regulator mechanism for clockwork, the combination with an escapement wheel and an oscillating member, of a lateral projection on the oscillating member, a spring-operated lever, a pliant pin adjustably mounted on said lever, said pin coöperating with the projection to impart impulses to the oscillating member, a stop limiting the inward movement of the pin, said stop being adjustable so as to vary the movement of the spring-operated lever carrying the pliant pin, a rocking lever and detent, said detent coöperating with the escapement wheel and in one position arresting the escapement wheel, a rocking arm adapted to arrest the escapement wheel in another position, the rocking lever being adapted to engage with the pressure lever, and means for rocking the lever and detent to release the escapement wheel, when said rocking lever is disengaged from the pressure lever.

7. In a regulator escapement mechanism for clockwork, the combination with an escapement wheel and a pendulum, of a lateral projection on the pendulum, a spring-operated pressure lever, a pliant pin adjustably mounted on said lever, a hard bearing surface on said lever, an adjustable stop, said stop limiting the movement of the lever, two rocking levers, a detent on one of the rocking levers, said detent being adapted to engage with the escapement wheel to arrest the movement thereof, a stop surface on the other rocking lever, said stop surface being adapted to engage with the escapement wheel, said detent on movement in one direction being adapted to rock the rocking lever into engagement with the bearing surface on the spring-operated pressure lever, and on return movement to effect the release of the escapement wheel, and a counterpoise on the first rocking lever, said counterpoise effecting the return movement of the rocking lever.

In testimony whereof I have signed my name to this specification in the presence of two subscribing witnesses.

CHARLES ERNEST JACQUEMOUD.

Witnesses:
CARL GUBER,
O. M. OURIG.

Copies of this patent may be obtained for five cents each, by addressing the "Commissioner of Patents, Washington, D. C."